Patented Aug. 9, 1938

2,126,463

UNITED STATES PATENT OFFICE 2,126,463

ANESTHETIC

Frederick E. Guntrip, Santa Barbara, Calif.

No Drawing. Application June 3, 1937,
Serial No. 146,244

8 Claims. (Cl. 167—52)

This invention relates to a volatile anesthetic associated with a stabilizer and anti-oxidant whereby the application of the anesthetic to its various uses and for various purposes is greatly improved and difficulties present in using pure volatile liquid anesthetics are either avoided entirely or greatly diminished. The present application may be considered as a substitute application for my two copending applications, Serial No. 61,958, filed February 1, 1936, and Serial No. 124,469, filed February 6, 1937, both entitled Anesthetic.

Some common volatile anesthetics, such as ether and chloroform, are frequently mixed with alcohol, the alcohol serving as a preservative. The alcohol, however, while being beneficial as a preservative is considered detrimental to a certain extent, to the patient. In other instances, ether has been mixed with oil in the form of an emulsion. However, the emulsion produced is unstable and separation or stratification takes place shortly.

It is an object of the present invention to provide an improved anesthetic which is more stable and which will retain its properties indefinitely without the use of alcohol as a preservative and which will not be subject to decomposition nor to the separation of the ingredients as in the case of emulsions.

It is another object of the invention to provide an improved anesthetic wherein fire and explosion hazards associated with the use of ether and some other volatile anesthetics are either avoided or at least greatly reduced.

It has also been customary with the use of a volatile anesthetic such as ether to apply it internally, that is, in the colon of the patient. When so used, the anesthetic is mixed with an oil such as olive oil, soy bean oil, or other vegetable oil, the ratio frequency being three parts of anesthetic to one or two parts of oil. Such a mixture or emulsion when applied internally, for instance in the colon, has certain disadvantages. A certain quantity of anesthetic must be administered to the patient but when the necessary amount of oil is added to the required amount of anesthetic the volume of the resulting mixture is in excess of the amount that the colon can retain, causing a quantity of the mixture or emulsion to be expelled during an operation and necessitating the use of a syphon tube. Another disadvantage of the mixture of anesthetic with oil is that it must be freshly prepared to assure its maintaining a state of emulsion, for in a relatively short length of time the oil and ether separate. The mixture herein described maintains indefinitely its state of solution once the solution is brought about and does not require further agitation or manipulation. It is, therefore, another object of this invention to associate a volatile liquid anesthetic with a small percentage of an agent which is not only a natural anti-oxidant for the anesthetic but which, when used in conjunction with the anesthetic in place of the oil, will occupy a very small volume with respect to the volume of the anesthetic. In this way, all of the advantages of the mixture or emulsion of oil and anesthetic are secured without materially increasing the volume of the anesthetic.

A further object of the invention is to combine with the volatile liquid anesthetic an agent that controls the volatilization of the anesthetic to substantially a constant rate so that in administering the anesthetic by inhalation, the use of cones is eliminated and in administering the anesthetic by colonic absorption the use of a funnel and its accompanying rectal tube as well as the syphon tube is eliminated, and when the anesthetic is completely volatilized the residue remaining consisting of the stabilizing agent is a chemically inert substance which will not be absorbed by the tissues of the body. In this manner if the anesthetic is internally applied the residue remaining after volatilization or absorption of the anesthetic need not be removed but may be allowed to remain to be expelled from the colon in its natural course.

With the above and other objects in view which will appear as the description proceeds, my invention consists in the improved composition hereinafter described and claimed. I take absolute ether and add chemically pure shredded coagulated latex or caoutchouc, which is a refined product derived from latex and bring these ingredients together in a suitable airtight container. The mass is allowed to macerate for from one to four days at atmospheric temperature and pressure. The length of time required varies with the atmospheric temperature. I have observed that maceration of the latex or caoutchouc by the ether is more rapid during warm weather than in cool weather. The latex or caoutchouc thus becomes completely dissolved in the ether. The latex however is chemically inert towards the ether and serves as a stabilizer and a natural anti-oxidant, thus preventing the ether from decomposing and controlling the rate of its volatilization. The rate of volatilization is naturally slower than if the latex or caoutchouc were not present.

The relative proportions of ether to latex or caoutchouc may vary depending upon the use to which the anesthetic may be put. Where the anesthetic is to be internally applied such as in the colon or is to be applied over severe wounds, it is maintained in a liquid form. The percentage by weight of latex or caoutchouc to ether ordinarily should not be less than 6% nor should it exceed about 20%. The percentage of latex present will control or effect the fluidity of the resulting composition. Where it is desired to have the anesthetic in the form of a jelly-like composition, that is one which is no longer pourable or fluid, the percentage of latex or caoutchouc to ether by weight may vary from 20% to as high as 33⅓%.

It is essential that pure ingredients be used, that the latex be chemically pure and free from any oxidized portion. If such oxidized portions are present they should be removed or cut away.

While the invention has been described in conjunction with the use of ether, it is equally applicable to either simple or compound volatile anesthetics including chloroform. The advantage of the improved anesthetic when in liquid form for use in colonic applications is that the volume of latex present to bring about the equivalent effect of oil is very small. Consequently, the volume of the entire anesthetic required to bring about equivalent anesthesia is much less than where oil is used and can consequently be received in the colon without difficulty. When the anesthetic has volatilized or has been absorbed by the blood stream, the remainder is pure latex or cautchouc which need not be removed but may be subsequently expelled naturally.

Where the anesthetic is in the form of a jelly-like substance or semi-solid, the rate of volatilization is kept constant or substantially so and the fire or explosion hazard is greatly reduced. It is possible to administer the anesthetic in this form by inhalation, direct from a bottle or jar containing the same without the use of cones.

In both forms of the invention, that is, either liquid or semi-solid, the composition will keep indefinitely without decomposition if kept in closed containers. In the preferred forms of the invention the liquid anesthetic contains approximately 10% of latex or caoutchouc while the jelly or semi-solid contains approximately 30% by weight.

Various changes may be made by those skilled in the art in the details of my invention without departing from the spirit of the invention as claimed.

I claim:

1. An anesthetic comprising coagulated latex (or caoutchouc) dissolved in a volatile liquid anesthetic.

2. An anesthetic in the form of a jelly or semi-solid comprising a volatile anesthetic associated with coagulated latex.

3. An anesthetic in the form of a jelly or semi-solid comprising coagulated latex and a volatile liquid anesthetic, the coagulated latex being present from 20 to 33⅓ percent by weight.

4. An anesthetic in the form of a jelly comprising ether and coagulated latex.

5. An anesthetic in the form of a jelly comprising ether and coagulated latex, the coagulated latex being present in approximately 30% by weight.

6. An anesthetic in the form of a liquid comprising a volatile liquid anesthetic containing less than 20 percent of coagulated latex in solution therein.

7. An anesthetic in the form of a liquid containing approximately 10 percent coagulated latex by weight in a volatile liquid anesthetic.

8. An anesthetic in the form of a liquid containing ether and coagulated latex or caoutchouc.

FREDERICK E. GUNTRIP.